UNITED STATES PATENT OFFICE.

WILLIAM CARR, OF BATH, MAINE.

IMPROVED MEDICINE FOR PILES.

Specification forming part of Letters Patent No. 38,466, dated May 12, 1863.

*To all whom it may concern:*

Be it known that I, WILLIAM CARR, a resident of Bath, in the county of Sagadahoc and State of Maine, have invented a new and useful composition to be used for the cure or alleviation of piles; and I do hereby declare that the ingredients thereof and the manner of compounding the same are fully set forth in the following specification.

In carrying out my invention I take a vessel (preferring an earthen one) of sufficient size to contain the quantity of the composition I desire to make. If we suppose the quantity to be three pints, I put two ounces of fir-bark into the vessel and pour three pints of boiling water on such bark, and place the vessel over a fire and allow the bark to steep for about one hour. Next I remove the vessel from the fire and strain the decoction, and add thereto the following, viz: five table-spoonfuls of pulverized maple, beech, or other hard-wood charcoal, two tea-spoonfuls of pulverized rosin, and one nutmeg in a powdered state. The whole is next to be well shaken, so as to cause a thorough mixture thereof, and is then ready for use.

In using my improved medicine or compound a person may take one-half of a wine-glassful of it twice each day.

The great advantage of my compound in the cure or alleviation of piles, or inflammation of the rectum and bowles, as well as for absorbing gases collected therein, has been fully demonstrated by long practice and experience.

I claim—

The above-described composition, as made of the ingredients and compounds in the manner set forth.

WILLIAM CARR.

Witnesses:
    R. H. EDDY,
    F. P. HALE.